Sept. 26, 1939.  F. E. AUSTIN  2,174,305
SCENIC INSECT CAGE
Filed March 24, 1937  2 Sheets-Sheet 2
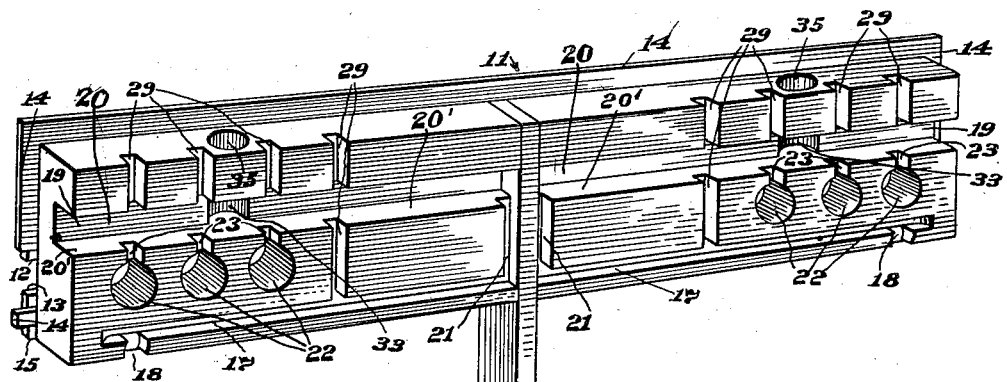
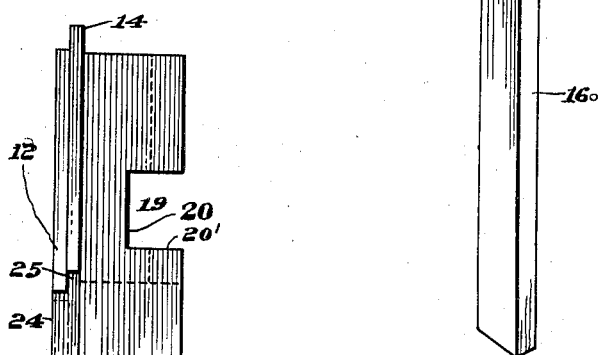
Fig.4
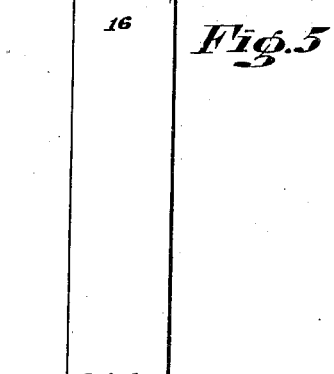
Fig.5
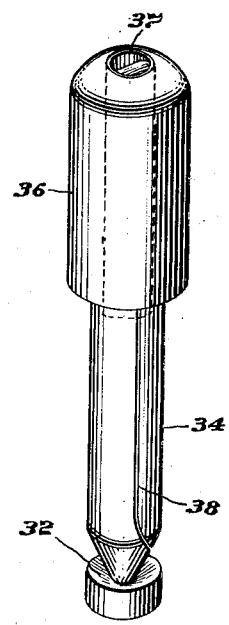
Fig.6
INVENTOR
Frank Eugene Austin
BY John E. R. Hayes
ATTORNEY Patented Sept. 26, 1939

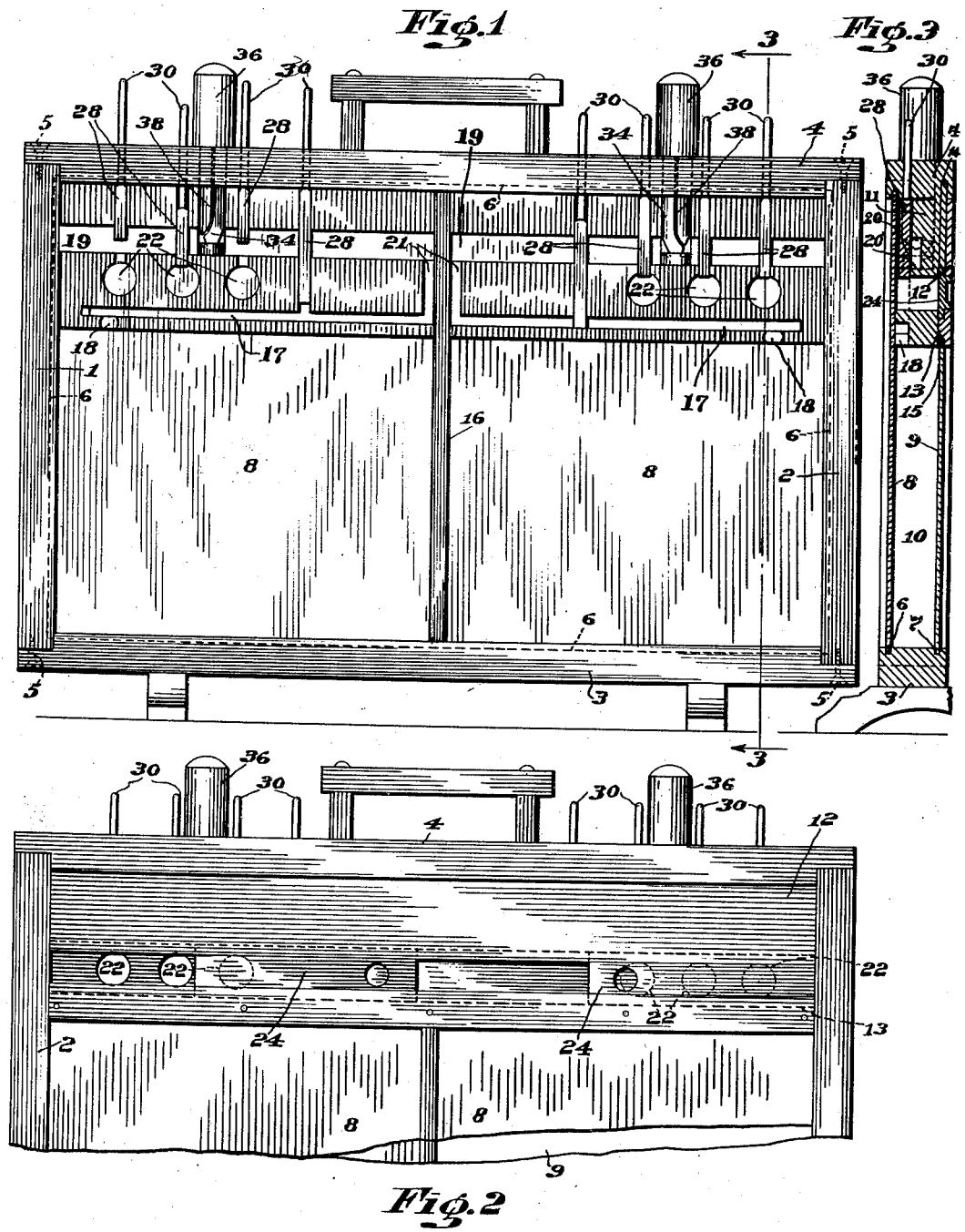

2,174,305

UNITED STATES PATENT OFFICE 2,174,305

SCENIC INSECT CAGE

Frank Eugene Austin, Hanover, N. H.

Application March 24, 1937, Serial No. 132,788

7 Claims. (Cl. 119—1)

The invention relates to a scenic insect cage, or one in which insects may be observed, and pertains especially to a cage for housing insects of the burrowing type, such as ants, the cage being provided with a filling in which the ants may burrow, or form tunnels.

Among the objects of the invention is to provide a cage of the above character, fitted with means by which the ants may be better observed and controlled; by which they may be cut off from certain parts of the cage, or some of the ants be segregated in a part, or parts, of the cage.

A further object of the invention is to provide a cage sectional in character for containing separate colonies of ants, in order that the relative movements thereof may be observed and studied.

A still further object is to provide a cage which provides for trapping of the ants in a certain section, or sections, of the cage, the number of trapped ants in a time interval in any action, or sections, of the cage affording opportunity for biological study and experiment.

The invention can best be seen and understood by reference to the drawings in which Fig. 1 is a front elevation of the cage.

Fig. 2 is a back elevation of a portion of the cage.

Fig. 3 is a section on the line 3—3 of Fig. 1.

Fig. 4 is a perspective of a certain structural part of the cage to which special reference will later be made.

Fig. 5 is an end elevation thereof; and

Fig. 6 is a side elevation of another element of the cage to which special attention will later be directed.

Referring to the drawings, the cage comprises a frame consisting of side bars 1 and 2, a bottom bar 3, and a head bar 4. These bars are connected in any suitable manner, as by screws 5, to form a substantially rectangular frame. The inner faces of the respective bars are provided with spaced grooves 6 and 7, respectively, of which the grooves 6 lie adjacent the front of the cage, and the grooves 7 adjacent its back. Within the grooves 6 of all the frame bars fits a front, or face, panel 8 made of glass. Within the grooves 7 in the bottom and side bars of the frame fits a back panel 9 which is preferably of glass, like the panel 8. This back panel does not extend to the top of the side bars and head bar, the top edge of the panel lying some appreciable distance removed from the head bar, but preferably above the middle of the cage.

The chamber 10 between the two spaced panels 8 and 9 forms a portion of the enclosure for the ants, and it is within this chamber that the filling is placed. Above this chamber, or space, between the two panels, the space within the frame which is closed on the front by the panel 8, is left open at the back, and contains a fashioned structure 11, preferably made of wood, which may consist of an integral bar, or combination of bars, made or fashioned to provide various channels, or cuttings, on its face adjacent the panel 8, or may be provided with openings through it, as will later be explained. The structure 11 is generally rectangular in form. In thickness it has substantially the width of the space between the panels 8 and 9. The structure at its front fits snugly against the panel 8. At its ends it fits snugly against the side bars of the frame between which it is interposed, and at its top snugly against the head bar of the frame. The bottom of the structure closes the top of the chamber 10 within which the filling is contained, and assists in the retention of the filling when snugly packed within this chamber. The structure 11 is held in place by spaced strips 12 and 13 secured to the back thereof. Of these strips the top strip 12 is made sufficiently larger than that portion of the structure 11 to which it is secured, to provide edgings 14 which fit, respectively, in the grooves 7 of the head bar and side bars of the frame to which they lie adjacent. Likewise, the lower strip 13 is provided with edgings 14 which fit within the side bars of the frame. In its under edge the strip 13 is provided with a groove 15 which receives the top edge of the back panel 9.

Preferably the cage is made sectional in character. In other words, that portion of the interior of the cage which contains the ants is divided by a central partition bar 16 in order that separate colonies of ants may be contained in a single cage. In such case, instead of one chamber 10, which contains the filling, there are two chambers 10, the fashioned structure 11 lying above each of these chambers. It is preferred that the structure 11 may itself be made in two parts between which the partition bar 16 is interposed in order that this bar may be securely held by the then two sections of the structure 11 and by the strips 12 and 13 on the back which hold the parts together. With the cage thus divided each chamber 10 which contains the filling, is provided with its own head structure 11 in which there may be provided various cuts, channels, ledges, and openings, along which the ants may pass, or gather, as they come and go to and from the filling, as it is desired that each structure 11 shall be so fashioned as to afford the best arrangement for exhibiting the ants. Inasmuch as the fashioning of the structures 11 is the same for each, a description of one will suffice for the other.

In the first place it will be observed that the structure 11 presents a relatively large facing against the front panel 8, and through which panel the facing is seen. On its front face adjacent its bottom edge the structure 11 is provided with a channel 17 to which access is had from the chamber 10 which contains the filling, through a cut 18 at the end of the channel adjacent the panel 8. Above the channel 17, preferably parallel therewith, the structure 11 is provided on its face with a relatively long deep channel 19 having an upright wall 20 facing the glass and a ledge 20' along the bottom of this wall. The upright wall and ledge present relatively large surface areas on which the ants may gather and along which they may pass. The channels 17 and 19 are connected by a cross cut 21 which faces the front panel, and preferably lies at the end of the channel 17 distant from the cut 18 through which entrance is had to the channel from the chamber 10 containing the filling. That portion of the structure 11 which lies between the channels 17 and 19 on the face thereof, is provided with one or more openings 22 which extend entirely through the structure and are closed by the glass panel 8 at the front, but open at the back. Entrance is had to each opening 22 from the channel 19 by way of a cross cut 23 adjacent the panel or glass 8. The openings 22 are normally closed at the back by a slide 24 on the back of the structure 11. The slide is retained by the strips 12 and 13 on the back of the structure, and is movable within ways 25 formed along the edges of these strips on which the slide may be moved for opening or closing the openings 22. Where the cage is made sectional in character, as described, there are two of the slides 24.

When cages containing ants are being shipped, it is desirable that all ants placed in a cage occupy only the compartments in the structure, or structures 11, and be kept away from the filling until the cage has arrived at its destination, when access may then be had for the ants to pass to the filling. To this end the cage is provided with a valve or valves 28. This valve consists of a preferably rectangular piece which slides within a way 29 formed within the face of the structure 11 and is movable up and down therein, and when moved down the lower end of the valve is adapted to extend across and close the channel 17, the channel being opened simply by drawing up the valve. The valve is moved up or down by means of a shank 30 which extends upwardly through the head bar 4 of the frame, the end of the shank being accessible outside the frame for opening or closing the valve. The valve fits snugly within its way and will maintain a determinate open or closed position therein by friction. As shown the valve extends across the channel 19 of the structure 11 but the valve does not close this channel owing to the depth of the channel, the ants being enabled to pass through the channel behind the body of the valve. Each one of the cross cut openings 23 which affords access to the openings 22 from the channel 19 is controlled by a similar valve in order that any opening 22 may be closed from the channel 19, or be opened in relation thereto.

Any suitable means may be provided for admitting air to the interior of the cage. In fact, sufficient air will enter the cage around the edges of the panels, or panes, of glass, and structure 11 which, while more or less tight within the frame, does not form a seal-forming connection therewith or with the grooves in the frame.

Food and drink are given the ants by means of a feed receptacle 32. This receptacle is located within an offset 33 from the ledge 20' formed in the upright wall 20 to the channel 19, thus lying adjacent the ledge 20' so that the ants will have direct access to the feed receptacle from off this ledge. The feed receptacle is borne by a shank 34 passed down through an opening 35 in the head frame bar 4 and in the structure 11 above the offset opening 33 which contains the feed receptacle. The shank is held by a handle 36 on its top which bears against the head bar when the feed receptacle is in place.

The cage is provided with a whistle 37 of common type, on the blowing of which the ants are excited into great activity. This whistle is socketed in the handle of the feed cup. The passage through the whistle is in open communication with the interior of the cage by communicating directly with the channel 19 of the structure 11 through a slit 38 cut in the shank which connects the feed cup to its handle. Thus air and vibrations on blowing the whistle will have direct entry into the channel 19 and interior chambers of the cage.

By means of the various valves the ants may be segregated, or trapped, in different compartments of the cage.

The openings 22, as they become charged with filling brought in by the ants, may be cleaned by first closing the entrance 23 to the opening to be cleaned and moving the slide 24 to uncover the back of the opening. For clearing some of the openings 22 it may be necessary to close the entrance to other openings from the channel 19, for the entrances to all openings which are uncovered by the slide should be closed.

The cage is assembled by first combining the side frame bars 1 and 2, and bottom bar 3. The panels 8 and 9 are then applied to these bars. The entire structure 11, as shown in Fig. 4, is then applied to the cage. The valves are then applied to the structure 11. The head bar 4 of the frame is then applied and fixed. The shank handles bearing the feed receptacles are then applied through the openings in the head bar. In this connection it will be noted that the handles bearing the feed receptacles are applied after the frame bars have been combined in order that the feed receptacles may be removed for refilling without undoing the cage in any way.

By the term "glass" as used herein, and in the appended claims, is meant to include any transparent material which may be employed to form a transparent panel, or face, to the cage, through which the interior thereof may be observed.

I claim:

1. In a scenic insect cage having parts forming an enclosure for containing insects and with space therein for containing a filling in which the insects may burrow, and which cage is provided with a glass side on the front thereof, a spaced panel at the back to the space containing the filling, said panel being of lesser height than said glass, a structure arranged above the space containing the filling in upward extension of said back panel and with which structure said panel has closed connection, said structure having in it a number of channels and cuts forming compartments open to the glass and communicating with the space containing the filling, and means otherwise assisting in the retention of said structure.

2. In a scenic insect cage having parts forming an enclosure for containing insects and with space therein for containing a filling in which the insects may burrow, said parts including bottom, side, and head frame bars, a front glass panel maintained by all of said bars, a back panel retained by said bottom bar and side bars and rising to a height less than the height of said glass panel, a structure arranged above the space for containing the filling in face contact with the glass and occupying the space between the top edge of the back panel and the head bar, said structure having cuts and channels therein open on the glass and in communication with the space containing the filling, and other means assisting in the retention of said structure within the frame bars.

3. In a scenic insect cage having parts including a frame forming an enclosure for containing insects and with space therein for containing a filling in which the insects may burrow, a feed receptacle for the ants insertable through an opening in said frame, a shank to which said feed receptacle is attached, a handle bearing said shank located outside the frame, and a whistle located within said handle, the inner end of which whistle is in open communication with the interior of the cage through said shank.

4. In a scenic insect cage having parts forming an enclosure for containing insects with space therein for containing a filling in which the insects may burrow and provided with a glass side, a structure adjacent the space containing the filling in closed connection therewith, said structure being open to the atmosphere outside the cage at the back and in face engagement with the glass at the front, said structure having in it a number of channels and cuts forming apartments open to the glass and in communication with the space containing the filling, and means for retaining said structure.

5. In a scenic insect cage having parts forming an enclosure for containing insects with space therein for containing a filling in which the insects may burrow and provided with a glass side, a structure adjacent the space containing the filling in closed connection therewith, said structure being open to the atmosphere outside the cage at the back and in face engagement with the glass at the front, said structure having in it cuts open to the glass within which the insects may be contained and including a passage leading to the space containing the filling, valvular means for controlling said passage, and means for retaining said structure.

6. In a scenic insect cage having parts forming an enclosure for containing insects with space therein for containing a filling in which the insects may burrow and provided with a glass side, a structure adjacent the space containing the filling in closed connection therewith, said structure being open to the atmosphere outside the cage at the back and in face engagement with the glass at the front, said structure having in it cuts open to the glass in communication with the space containing the filling and including a compartment with opening to the atmosphere through the rear side of said structure, a movable closure to said opening, and means for retaining said structure.

7. In a scenic insect cage having parts forming an enclosure for containing insects with space therein for containing a filling in which the insects may burrow and provided with a glass side, a structure adjacent the space containing the filling in closed engagement therewith and in face engagement with the glass, said structure being open to the atmosphere outside the cage at the back and in face engagement with the glass at the front, said structure having in it cuts open to the glass and in communication with the space containing the filling including an elongated channel and a series of compartments adjacent said channel but removed from it, each of said compartments being closed by the glass at the front and open to the atmosphere at the back through the rear side of said structure, a movable closure for said compartments, passages leading from said channel to said several compartments, and valvular means for controlling each of said passages.

FRANK EUGENE AUSTIN.